United States Patent [19]
Johannessen et al.

[11] 3,761,946
[45] Sept. 25, 1973

[54] RADIO ALTIMETER WITH RATE OF HEIGHT CHANGE INDICATION
[75] Inventors: Rolf Johannessen, Harlow; Joseph Mun, Bishops Sturtford, both of England
[73] Assignee: International Standard Electric Corporation, New York, N.Y.
[22] Filed: Jan. 24, 1972
[21] Appl. No.: 219,963

[30] Foreign Application Priority Data
Jan. 22, 1971 Great Britain...................... 2,923/71

[52] U.S. Cl....................... 343/12 A, 343/9, 343/14
[51] Int. Cl............................. G01s 9/24, G01s 9/44
[58] Field of Search......................... 343/12 A, 9, 14

[56] References Cited
UNITED STATES PATENTS
3,305,862  2/1967  Samuel et al..................... 343/12 A
3,522,602  8/1970  Ver Planck............................ 343/9

Primary Examiner—Benjamin A. Borchelt
Assistant Examiner—G. E. Montone
Attorney—C. Cornell Remsen, Jr. et al.

[57] ABSTRACT

An FM/CW radio altimeter of the type which measures altitude as a function of the beat frequency signal resulting from mixing of the received energy against a portion of the transmitted signal. A circuit is included for determining the rate of change of altitude with time. A portion of the beat frequency signal is bandpass filtered and differentiated to reset a digital counter driven by a timing oscillator. The count is sampled and displayed and gives a measure of the rate of change of height of the aircraft. The dh/dt output is itself inherently digital and may therefore be presented in a counter type display. The rate of change signal is derived without differentiating or otherwise processing the output signal of the overall device as fed to a height display.

10 Claims, 5 Drawing Figures

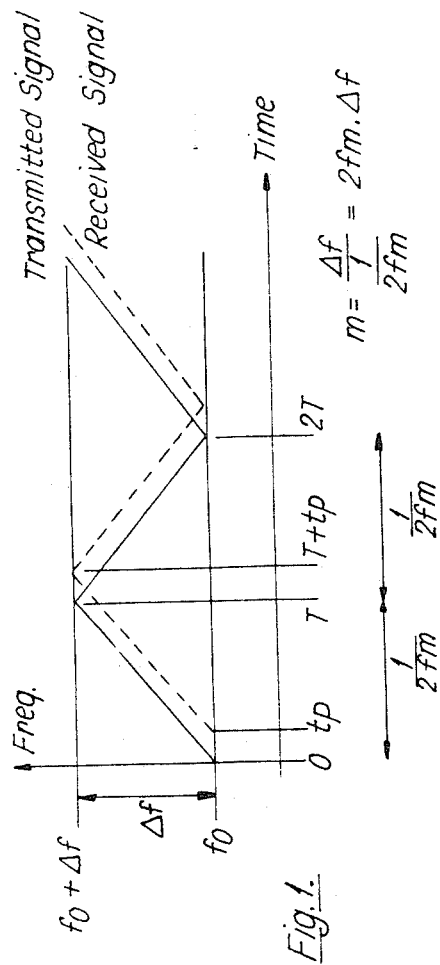
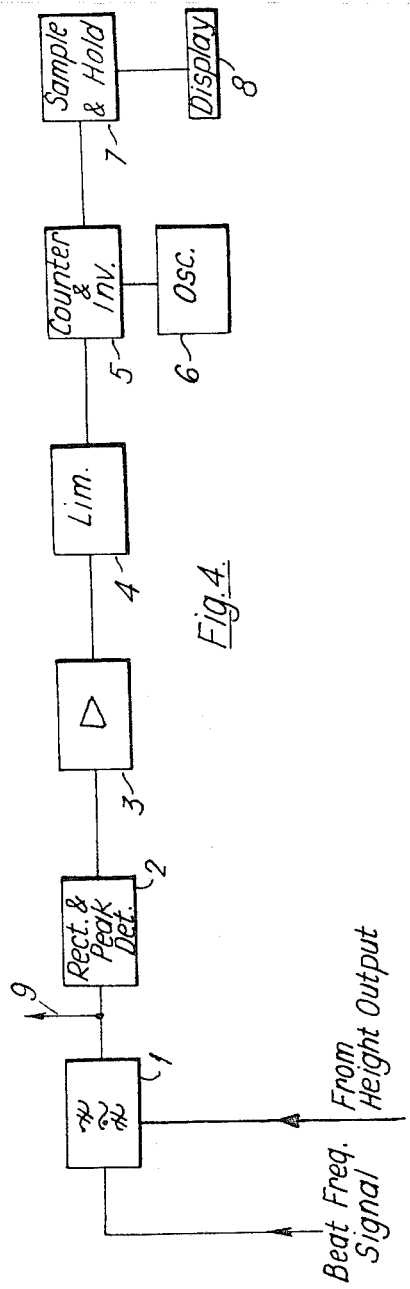

Carrier frequency centered at 4.3 GHz
Modulation frequency 300 Hz

RADIO ALTIMETER WITH RATE OF HEIGHT CHANGE INDICATION

CROSS REFERENCE TO RELATED APPLICATION

This application is filed under the provisions of 35 U.S.C. 119 with claim for the benefit of the filing of an application covering the same invention filed Jan. 22, 1971, Ser. No. 2923/71, in Great Britian.

BACKGROUND OF THE INVENTION

1. Field of the Invention

This invention relates to radio altimeters of the frequency modulated type.

2. Description of the Prior Art

The so-called FM type radio altimeter is a form of range-finder in that it measures the height above ground (terrain clearance) from an airborne vehicle. Thus, unlike the well known barometric altimeter, which measures height above sea level, the radio altimeter provides a more useful height indication, particularly at low or moderate altitude flight levels over mountainous terrain or on final landing approaches.

The general prior art in radio altimeters of the type is extensively described in the technical literature. The textbook "Electronic Avigation Engineering" by Peter C. Sandretto, (published in 1958 by International Telephone and Telegraph Corporation) is one such reference. In particular, Chapter 16 of that book (Paragraph 16.1) describes the basic prior art frequency-modulated radio altimeter system. In that reference it is pointed out that a radio altimeter is a form of range-finder. The transmitted signal, being modulated usually by a triangular frequency varying function, receives reflections continuously from the ground below the aircraft. A receiving antenna at the aircraft and part of the radio altimeter system receives this reflected energy as well as a portion of the transmitted energy. Since the transmitted energy is continuously modulated, it will have passed on beyond the frequency of the reflected energy in all cases of finite height at the time the beat frequency is automatically generated between these two frequencies. The frequency of the beat is proportional to the difference between transmitted and received frequencies at any instant, and, therefore, obviously proportional to the distance traveled by transmitted energy before it is again received as reflected energy. Accordingly, the frequency of the beat signal provides a directly proportional measurement of distance, or, in this case, altitude.

In some altimeter designs a narrow band receiver is employed to give good signal-to-noise ratio. U.S. Pat. No. 3,344,423 describes such a system, having a filter passband small compared with the width of the beat spectrum.

Certain problems are inherent in such systems. For example, when the altimeter is working at relatively low altitude, the audio waveform components are shown in FIG. 2, but when the height changes by a small amount (on the order of one eighth of the r.f. wavelength), the components of the audio frequency change to those shown in FIG. 3, and in this state the dominant harmonic, which corresponds to the true height, may have a small amplitude.

An altimeter employing a narrow band tracking filter may exhibit false readings because the filter tends to lock onto the component having the highest amplitude, giving rise to an erroneous frequency reading equal to the modulation frequency (which typically may be 300 Hz). Moreover, if the filter is designed to lock to the component of lowest frequency once this signal is above some threshold level, it will most likely lock to the modulation frequency whiich is the fundamental harmonic ($n=1$). This component will always be present and its magnitude only is significant at low altitudes, such as on final landing approach, especially below about 50 ft.

Because the frequency separation between components of the audio signal is the modulation frequency, and because the amplitude of those components is greatly affected by small changes in height, there is a theoretical minimum bandwidth that can be employed in such a system.

The duration of the erroneous signal depends greatly on the constancy of the aerial-ground separation. Operation over rough terrain is not likely to be a problem, but hovering aircraft over a spectral surface, or aircraft in flare (final landing approach) may find the operation insufficiently accurate.

To overcome the problem a search system which alters the modulation rate, or which maintains the rate but alters the modulation duration, is likely to be more effective than one which searches for the "beat frequency" but maintains the modulation. Double modulation (modulating on the modulation frequency) also affords a possible approach.

Even when the passband of the receiver is wide compared with the width of the best spectrum received over a variety of terrain, problems can arise when over specular terrain. Only when the receiver response is flat will be signal presented to a counter be a faithful reproduction of the waveform at the mixer. With non-flat responses, distortion may give rise to a false number of zero crossings or to a false interval between zero crossings.

A survey conducted on altimeter operational requirements indicated a need for a signal representing dh/dt. Moreover, this signal should be derived by means other than differentiating the height output, and would be useful during the flare when over a good specular reflecting surface.

The manner in which the present invention solves problems hereabove discussed in a unique manner will be understood as this description proceeds.

It is difficult to utilize Doppler techniques to solve these problems, since the Doppler shift associated with 4.3 GHz (which is the frequency allocated to radio altimeters) and a sink rate of 2 ft/s is about 9 Hz. It is therefore necessary in such a system, to stop the modulation of the transmitter for a substantial period to assess the Doppler shift, and therefore, sink rate and actual height cannot be assessed simultaneously.

The invention provides an arrangement in which characteristics of the beat frequency signal from the mixer are utilized to obtain a measure of the rate of change of height of an aircraft.

According to the invention there is provided a radio altimeter of the frequency modulated carrier wave type including means for extracting a portion of the beat frequency signal, passing it through a bandpass filter, and differentiating (in effect) the filter output. A digital counter, with a timing oscillator, receives this differentiated signal. The counter is driven by the oscillator and the differentiated signal is applied to reset the counter. The output of the counter is then displayed to the pilot of the aircraft to advise him of his rate of ascent or descent.

In one embodiment of the invention, the bandpass filter is constructed so that the center of the passband may be dynamically adjusted with reference to the height output of the altimeter. This is in consideration of the fact that the higher the altitude the higher the beat frequency, a fact understood from the prior art.

The present method of obtaining the height rate output is based on the fact that the amplitude of the dominant harmonic (and the harmonics adjacent to it) is greatly affected by small changes in height. A narrow band filter, not necessarily centered at the dominant harmonic will have its output amplitude modulated by a frequency which is a function of the rate of descent or ascent.

Utilizing the frequency sweep (FM function) reversal discontinuities as a means of obtaining rate output has certain advantages as follows:

Compared to Doppler methods there are two advantages:
 i. Height and height rate can be obtained simultaneously.
 ii. No complication is required in the modulation waveform.

Compared to differentiation of analogue height output the advantage is:
 iii. Rate output is readily available in analog or digital form.

Compared to either Doppler or differentiation arrangements, there is the disadvantage that the method of measurement does not differentiate between height increase and height decrease. This sense of the height change is obtained from the height output.

In order that the above and other features of the invention may be best understood, a more detailed description and analysis follows.

BRIEF DESCRIPTION OF THE DRAWINGS

FIG. 1 is a graph illustrating frequency variation of transmitted and received signals for a triangularly modulated signal.

FIG. 4 is a block diagram of an arrangement for obtaining a rate of change of height output from a frequency modulated carrier wave altimeter.

DESCRIPTION OF THE PREFERRED EMBODIMENT

Figure 2:
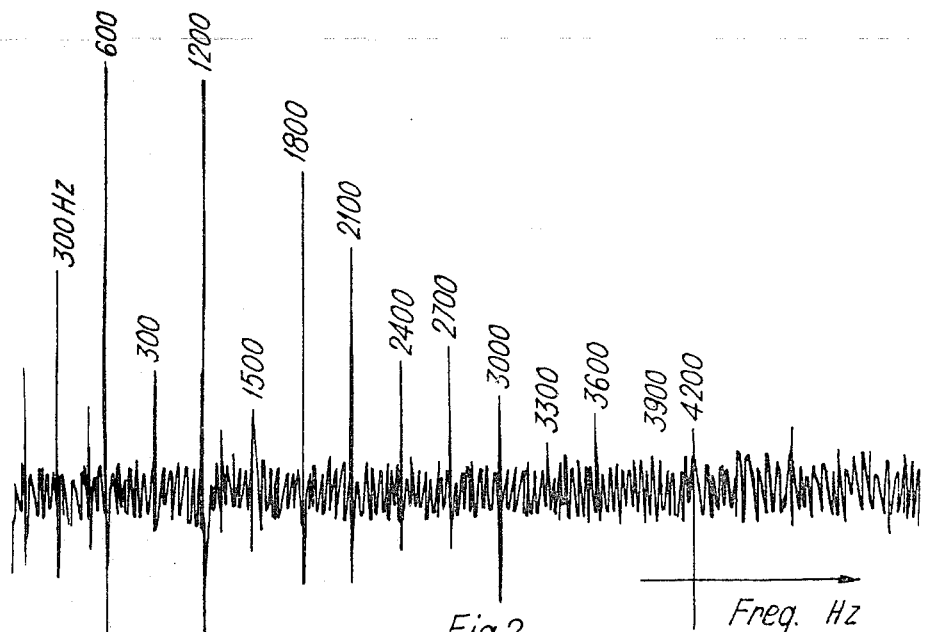
FIGS. 2 and 3 illustrate the change in the relative amplitude of the components of the beat signal frequency resulting from a small change of height.

Before proceeding with the description of the structure and function of a typical embodiment of the invention, some analytical treatment of the radio altimeter is considered appropriate.

The instantaneous amplitude of the beat signal coming from the mixer receiving the reflected and a portion of the transmitted signals is proportional to the vector sum of the two signals being mixed. The amplitude of the beat signal is therefore very much tied to the phase difference between the two vectors.

Reference is made to FIG. 1 to give physical significance to the frequency and time aspects of the following analysis.

During the frequency increase part of the modulation cycle $$f = f_o + mt$$

frequency and phase are always related by $$f = (d\phi/dt)$$

Therefore $$\phi = \int f dt = \int f_o dt + \int mt\, dt = f_o t + \frac{1}{2} mt^2$$

(Equation I)

At any time during this part of the modulation cycle the phase of the transmitter vector and the phase of the ground returned signal can be expressed by Equation I allowing for the propagation time from aerial to ground and back. If this time is called $t_p$, then the phase difference between the two signals being mixed will be:

$$\phi(t) = t_p [f_o - (1/2)\, m\, t_p + mt] - \phi_k$$

(II)

where $\phi_k$ is a phase shift introduced by the ground interface (nominally 180°). The signal $\phi(t)$ is in terms of revolutions such that $\phi(t) = 1$ when the phase difference is 360°. For most practical radio altimeters, $m\, t_p \ll f_o$ and accordingly, Equation II above, can be simplified to Equation III following. Similar considerations give the equations for the other parts of the modulation cycle so that Equation III is presented for all parts of the modulation cycle.

During the nth upwards sweep
$$\phi(t) = t_p [f_o + mt] - \phi_k$$
During the nth downwards sweep
$$\phi(t) = t_p [f_o + 2mT - mt] - \phi_k$$
During the $(n + 1)$ th upwards sweep
$$\phi(t) = t_p [f_o + m(t - 2T)] - \phi_k$$

(III)

In all these cases the modulation period is 2T, and in all cases the beat signal waveform is $$E(t) = k \cos(360 \times \phi(t))$$

(IV)

where $k$ is some factor. The behavior in the region $T < t < T + t_p$ is ignored since it lasts for a time which is very short compared to the rest of the modulation cycle.

Equation III is a periodic function of period $2T = 1/f_m$. Four equations are necessary to describe the function completely between the intervals, as follows:

$$0 < t < t_p$$
$$t_p < t < T$$
$$T < t < T + t_p$$
$$T + t_p < t < 2T$$

where $t_p$ is the time taken for the signal to travel from transmitter to the ground reflector and return. This is a small quantity compared to the period of the modulation frequency, e.g.

$$t_p = (2H/c) \ll 1/(2 f_m)$$

$1/(2 f_m)$ order of ms $(2H)/c$ order of μs for H of 1,000 ft.

Therefore, small intervals $0 < t < t_p$ and $T < t < T + t_p$ can be neglected in the calculation. Any periodic function of period 2T can be described by a trigonometric series of the form:

$$E(t) = \frac{a_0}{2} + \sum_{n=1}^{\infty} \left( a_n \cos \frac{n\pi t}{T} + b_n \sin \frac{n\pi t}{T} \right)$$

(Equation V)

The coefficients, $a_o$, $a_n$ and $b_n$ of Equation $V$ are given by:

$$a_o = \frac{1}{2T} \int_0^{2T} E(t) \, dt \quad \text{(Equation VI)}$$

$$a_n = \frac{1}{T} \int_0^{2T} E(t) \cos \frac{n\pi t}{T} \, dt$$

(Equation VII)

$$b_n = \frac{1}{T} \int_0^{2T} E(t) \sin \frac{n\pi t}{T} \, dt$$

Equation VIII)

When the standard integration has been performed it can be shown that the coefficients become $$a_n = (4T \, t_p m) / [\pi (4T^2 t_p^2 m^2 - n^2)] \, [\sin 2\pi t_n f_o - (-1)^n \sin 2\pi t_p (f_o + mT)] \quad \text{(IX)}$$

$$b_n = 0 \quad \text{(X)}$$

from which it is seen that a small change in height gives a large change in $a_n$ and further a large change in height gives an oscillatory change in $a_n$. It is this oscillation in $a_n$ which is used in this invention.

Figure 3:
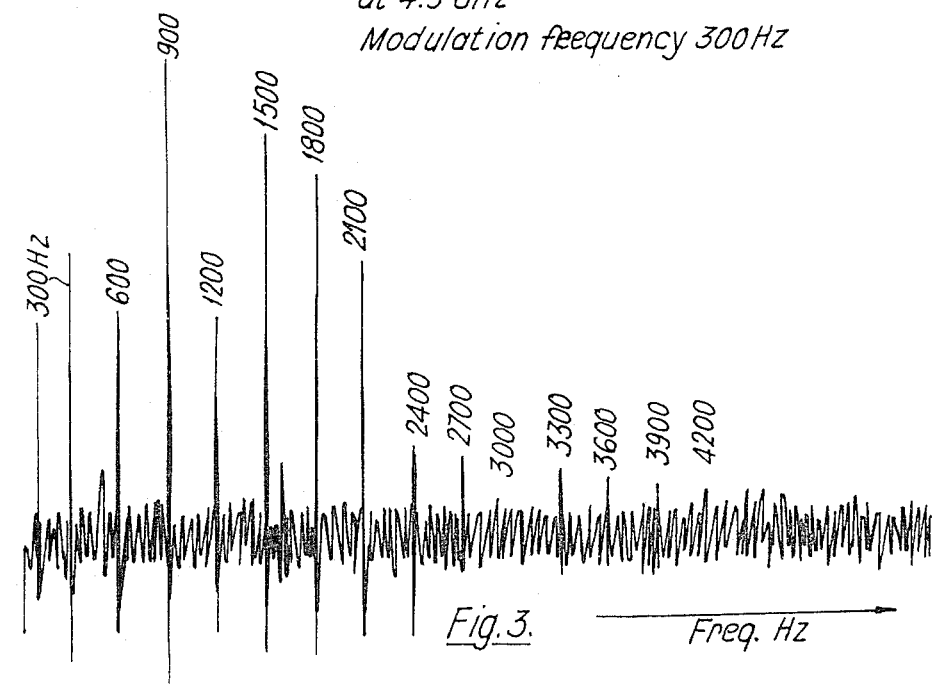

The arrangement for obtaining a signal representing dh/dt is shown in FIG. 4. A portion of the beat frequency signal as available in the standard FM radio altimeter system at the receiving antenna is fed to a bandpass filter 1. This beat frequency contains a number of frequency components as seen by Equation V and as measured in a specific case and shown in FIG. 3. The bandpass filter 1 is centered at $nf_m$ and has a passband less than 2 fm. If dh/dt = 0 then the output of the filter 1 will be a sinusoidal signal with constant amplitude and with frequency $nf_m$. If dh/dt ≠ 0, then the frequency will remain constant but the amplitude will vary with time and this time variation is related to the sink or climb rate of the altimeter.

The waveform at the filter is as shown by FIG. 5a.

Figure 5:
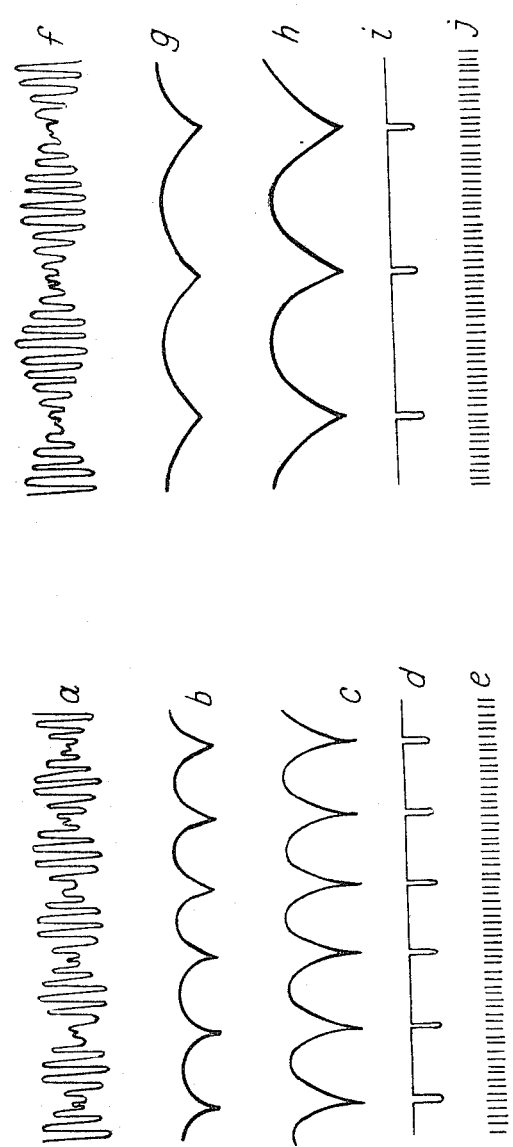
FIG. 5 illustrates typical waveforms related to FIG. 4.

This signal is rectified and a peak detector ensures that the signal output from rectifier and peak detector 2 is as shown by FIG. 5b. The component $nf_m$ is not present at this point in the equipment. This signal is now amplified in amplifier 3, giving waveform 5c, and then passed through limiter 4, giving waveform (FIG. 5d), which is seen to be a series of negative going spikes. An oscillator 6 operates at a frequency considerably higher than the frequency of the signal coming out of 3 and drives a counter 5 such that the counter increases by one on each cycle from the oscillator 6. The spikes from limiter 4 are used to reset the counter. Thus the counter will on each reset pulse contain a number or count, FIG. 5e, inversely proportional to dh/dt (the higher dh/dt the smaller the number held in the counter). To make the output a practical one from a pilot's point of view the number should be proportional to dh/dt. Also the display must be presented at a rate slow enough for the pilot to use, say once every 5 seconds. On the reset pulse the number in the counter is therefore inverted. The counter is periodically sampled and the inverted count is passed to a holding buffer 7 which is connected to display 8, the latter being a digital read-out or a meter (analog) display. If the term dh/dt reduces, then the waveform will become as shown by FIG. 5, f-j. Therefore, as a change of height occurs the display will show a count indicative of the desired rate of change term. Accordingly, a series of readings could be interpreted as follows:

```
0 0 0 0 1 2 3 4 4 4 4 4 3 2 1 0
no change|rate of change|rate of change|rate of change
of height| increasing   | constant     | decreasing
```

It will be obvious from the foregoing explanation that the arrangement just described will only be satisfactory for at most a limited range of heights. For operation over a wide range of heights the center frequency of the passband will require dynamic adjustment with reference to the aircraft height. To achieve this, the height output of the altimeter can be used to control the center frequency of the filter. For example, a filter based on a tuned circuit with a variable capacitance circuit responsive to the height output signal in digital or analog form could be used. It may also be desirable to change the Q of the filter, in order to adjust the bandwidth of the filter. Again, if a tuned circuit is the basis of the filter, the height output of the altimeter can be used to control a variable resistance (either in digital or analog fashion) to alter the Q of the circuit. The frequency of the oscillator and the speed of the counter must be such as to give the required resolution in the rate of change signal.

A connection from the lead between filter 1 and detector 2 provides an alternative location for the signal take-off to the altitude value read portion of the prior art FM radio altimeter, which would normally receive the same signal as the input of filter 1.

It is to be understood that the foregoing description of specific examples of this invention is not to be considered as a limitation on the scope of the invention, the description and drawings being typical and illustrative only.

What is claimed is:

1. A rate-of-height-change device for inclusion in a radio altimeter of the frequency modulated type, producing a beat frequency signal characterizing the altitude and available within said radio altimeter, comprising the combination of:

a bandpass filter responsive to said beat frequency signal;

means responsive to the output of said filter for developing a signal representative of the derivative of the waveshape of said filter output;

a timing oscillator having a frequency higher than the frequencies expected in said derivative signal;

a digital counter responsive to said timing oscillator to count the cycles thereof;

means responsive to said derivative signal to terminate the count of said counter at discrete times whenever said derivative signal attains a predetermined condition;

and means for displaying and holding said counter output for a predetermined time for visual observation.

2. Apparatus according to claim 1 in which said means for developing said signal representative of the derivative includes means for deriving a signal representative of the envelope of the signal at said filter output, and means for detecting selected inflection points in said envelope and for producing said derivative signal in the form of pulses corresponding in real time to the occurrence of said inflection points.

3. Apparatus according to claim 2 in which said means for deriving said signal representative of said envelope comprises rectifying means peak detecting the output of said filter, thereby to develop said envelope signal in the form of a signal having relatively sharp minimum values.

4. Apparatus according to claim 3 in which said rectifying means is followed by amplifier and limiter means for producing said derivative pulses.

5. Apparatus according to claim 4 in which said derivative pulses are applied as triggering pulses to terminate said count of said counter, and said discrete times are substantially the times of occurrence of said derivative pulses.

6. Apparatus according to claim 5 including means for inverting said count whereby said display and holding means receives a count directly rather than inversely proportional to said rate-of-height change.

7. Apparatus according to claim 6 in which said filter is also responsive to a signal representing altitude, separately determined by said radio altimeter, to control the center frequency of said filter as a function of altitude.

8. Apparatus according to claim 6 in which said filter is also responsive to a signal representing altitude, separately determined by said radio altimeter, to control the passband characteristics of said filter as a function of altitude.

9. Apparatus according to claim 1 including means for controlling at least the center frequency of said filter as a function of altitude in response to a separately provided altitude-representing signal produced by said radio altimeter.

10. Apparatus according to claim 1 including means for controlling at least the passband characteristics of said filter as a function of altitude in response to a separately provided altitude-representing signal produced by said radio altimeter.

* * * * *